A. D. WYCKOFF.
WEATHER PROTECTED OIL DISPENSING APPARATUS.
APPLICATION FILED APR. 11, 1921.

1,428,737. Patented Sept. 12, 1922.

Inventor;
Andrew D. Wyckoff.
By Charles A. Shervey
his Atty

Patented Sept. 12, 1922.

1,428,737

UNITED STATES PATENT OFFICE.

ANDREW D. WYCKOFF, OF OAK PARK, ILLINOIS.

WEATHER-PROTECTED OIL-DISPENSING APPARATUS.

Application filed April 11, 1921. Serial No. 460,375.

*To all whom it may concern:*

Be it known that I, ANDREW D. WYCKOFF, a citizen of the United States, and a resident of Oak Park, Cook County, and State of Illinois, have invented certain new and useful Improvements in Weather-Protected Oil-Dispensing Apparatus, of which the following is declared to be a full, clear, and exact description.

This invention relates to weather protected oil dispensing apparatus, and its principal object is to provide a novel arrangement of parts, whereby oil, or other liquid, may be dispensed from a tank located within a building, but accessible from without the building, whereby liquid may be dispensed therefrom by a person outside the building. This invention has been particularly designed for use in garages and public filling stations and is intended to make it convenient to dispense oil from the outside of the building as well as from the inside of the building from a tank located within the building, and one of the objects is to provide means associated with oil dispensing apparatus for protecting the interior of the building against the entrance of rain, snow, sleet and wind while oil is being dispensed from the apparatus when the dispensing mechanism is exposed to the outside of the building. Another object is to provide oil dispensing apparatus with a swiveled or rotatable support, whereby the discharge nozzle of the dispensing apparatus may be shifted from one position to another over the tank to permit of the dispensing of the liquid contents from one or the other side of the tank. Another object is to provide a movable wind shield in connection with such dispensing apparatus, whereby it may in all cases protect the interior of the building from the inclemencies of the weather and yet permit the dispensing apparatus to be handled from the inside or the outside of the building.

With these and other objects and advantages in view, this invention consists in a tank or container provided with liquid dispensing apparatus and having a wind shield, rotatively mounted on or adjacent the tank behind the dispensing apparatus, whereby the windshield may be moved out of the way for access to the dispensing apparatus at either side of the tank. The invention further consists in the several novel features hereinafter fully set forth and claimed.

Figure 1:
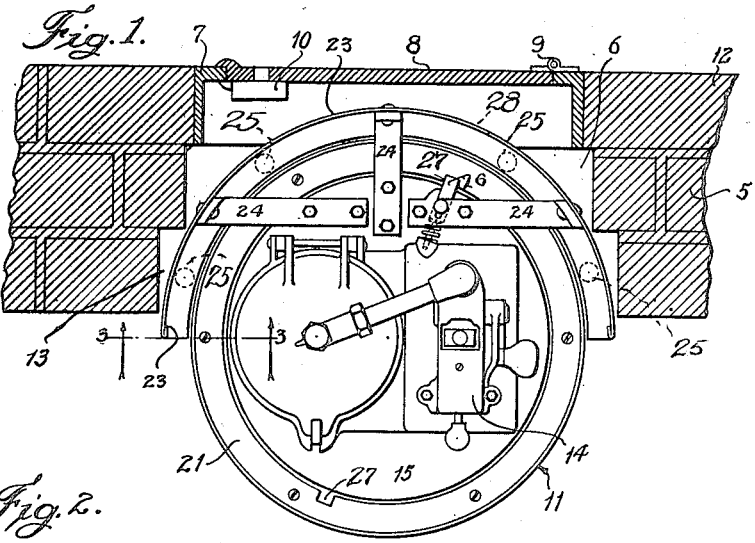
Figure 2:
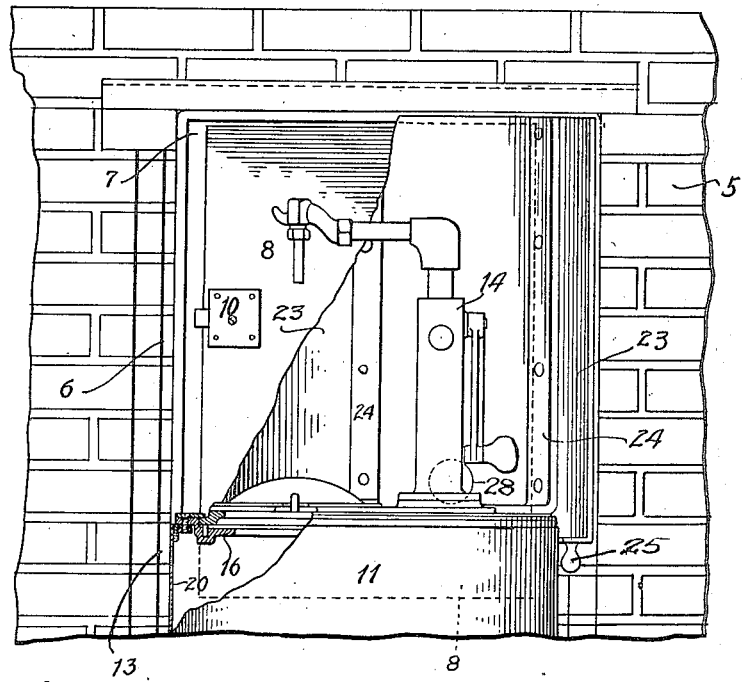
Figure 3:
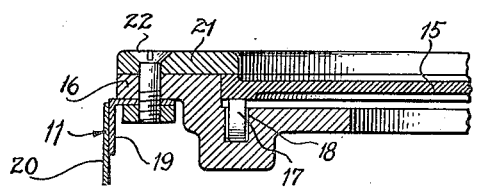

The invention is clearly illustrated in the drawing accompanying this specification, in which Fig. 1 is a view partly in plan and partly in horizontal section of apparatus embodying a simple form of the present invention; Fig. 2 is a fragmental front view thereof looking in the direction of the arrow 2 in Fig 1, the windshield being partly broken away to expose parts behind the same, and Fig. 3 is a detail, vertical cross-section taken on the line 3—3 of Fig. 1 and showing the parts upon an enlarged scale.

Referring to said drawing, the reference character 5 designates a fragment of the wall of a building such as a garage or service station, in which is formed an opening 6 through which access is afforded to the interior of the building from without. A door frame 7 is secured in said opening 6 and a door 8 is attached to said frame, as by hinges 9, and is provided with a lock 10 whereby the door may be securely locked in place to close the opening 6.

A tank or reservoir 11 for containing oil or other liquid to be dispensed, is placed in the building adjacent, and below, said opening 6, and, as a preference, is placed quite close to the door frame 7, and in case the wall 5 is built of brick or other masonry, a number of the bricks or blocks may be omitted behind the outer facing 12 of the wall 5, in back of said door frame 7, so as to provide a recess or nitch 13 in the wall to receive the tank 11, and its associated parts.

The dispensing apparatus, designated generally by the reference character 14, may be of any of the common, well known forms of mechanism for dispensing oil or other liquids and in the present instance said dispensing apparatus is mounted upon a top plate 15 which is rotatively mounted upon the top 16 of the tank 11. In the preferred embodiment of the invention, I have provided anti-friction members between the top plate 15 and top 16, which are here shown in the form of rollers 17 located in recesses 18 formed in the top 16, which are distributed around the top 16 adjacent the marginal edge of the plate 15. Said top 16 may be in the form of a ring or annual member, to leave a central opening for access to the interior of the tank, and the said ring 16 is secured to the head 19 of the tank which is spot-welded or otherwise permanently fastened to the side wall 20 of the tank 11. A ring 21 is secured to the top 16 by bolts or screws 22 and said ring 21 overhangs the plate 15 and holds it in place on the top of the tank.

Secured to said plate 15 is a shield 23 which extends up from the top of the tank and practically closes the opening 6 in the wall 5. Said shield is preferably semi-cylindrical in form, as clearly illustrated in Fig. 1 and is supported from the plate 15 by brackets 24. Said shield is arranged concentric with the tank 11 and partly incloses the dispensing apparatus 14.

When the parts are in the position shown in the drawing, the dispensing apparatus is in position accessible from the interior of the building and oil may be dispensed therefrom in the usual manner. To dispense oil from the tank from the exterior of the building, the door 8 is unlocked from its casing or frame 7, opened and the shield 23 and dispensing apparatus 14 are swung around to bring the shield to the opposite side of the tank, thereby exposing the dispensing apparatus to the outside of the building, and at the same time keeping said opening 6 closed against the entrance of snow, rain, sleet, and wind to the interior of the building. Oil may now be dispensed from the tank from the outside of the building, and after the device has been used, the door may be closed and locked, and if it later becomes necessary to dispense oil from the interior of the building the shield and dispensing apparatus may be turned around to gain access to the dispensing apparatus from the inside.

I have provided knobs 25 on the wind shield 23 which may be taken hold of in turning the shield to expose the dispensing apparatus. I have also provided a lock for securing the parts in place with the dispensing apparatus exposed to the inside or outside of the building. Said lock comprises a spring pressed bolt 26 mounted on the top plate 15 and arranged to enter either of two notches 27 which are formed in the ring 21. The bolt 26 is accessible from the wind shield side of the apparatus, through a hand hole 28 in the shield.

While a single apparatus has been shown and described, a number of them may be placed side by side in a building all accessible from the inside and outside of the building. In both the single and plural use of the apparatus, sliding doors may be substituted for the hinged doors, as is well understood.

More or less variation of the exact details of construction is possible without departing from the spirit of this invention; I desire, therefore, not to limit myself to the exact form of the construction shown and described, but intend, in the following claims, to point out all of the invention disclosed herein.

I claim as new and desire to secure by Letters Patent:

1. Weather protected liquid dispensing apparatus comprising, a tank, liquid dispensing apparatus rotatively mounted thereon and a windshield partly surrounding said liquid dispensing apparatus and mounted to rotate therewith.

2. Weather protected liquid dispensing apparatus comprising, a tank, liquid dispensing apparatus rotatively mounted thereon and a windshield partly surrounding said liquid dispensing apparatus and mounted to rotate therewith.

3. Weather protected liquid dispensing apparatus comprising, a tank having a top plate swiveled thereon, dispensing apparatus mounted upon said plate and a windshield partially surrounding said dispensing apparatus and supported by said top plate.

4. Weather protected liquid dispensing apparatus comprising, a tank having a top plate swiveled thereon, liquid dispensing apparatus supported by said plate and a semi-cylindrical windshield extending above said tank and partially surrounding said dispensing apparatus, said windshield being supported by and movable with said top plate.

5. The combination of a wall having an opening therein and a door for closing said opening, of an oil tank located adjacent said opening and having a top plate swiveled thereto, liquid dispensing apparatus mounted on said top plate and located behind said door opening and a semi-cylindrical windshield extending into said opening and partially surrounding said liquid dispensing apparatus, said windshield being supported by and movable with said top plate.

6. Weather protected liquid dispensing apparatus comprising, a tank, liquid dispensing apparatus rotatively mounted thereon, a windshield partly surrounding said liquid dispensing apparatus and mounted to rotate therewith, and means for releasably securing said shield in a plurality of positions around the tank.

7. The combination of a wall having an opening therein and a door for closing said opening, of an oil tank located adjacent said opening and having a top plate swiveled thereto, liquid dispensing apparatus mounted on said top plate and located behind said door opening, a semi-cylindrical windshield extending into said opening and partially surrounding said liquid dispensing apparatus, said windshield being supported by and movable with said top plate, and means for releasably securing said shield in place at opposite sides of said tank.

8. Weather protected liquid dispensing apparatus comprising, a tank, liquid dispensing apparatus rotatively mounted thereon, and a rotatively mounted windshield partly surrounding said liquid dispensing apparatus, and having handles whereby it may be rotated.

ANDREW D. WYCKOFF.